(12) United States Patent
Mori

(10) Patent No.: US 6,301,063 B1
(45) Date of Patent: Oct. 9, 2001

(54) COLOR IMAGE READOUT LENS

(75) Inventor: Masao Mori, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/527,580

(22) Filed: Mar. 17, 2000

(30) Foreign Application Priority Data

Mar. 29, 1999 (JP) .................................................. 11-086417

(51) Int. Cl.$^7$ ....................................................... G02B 9/60
(52) U.S. Cl. ............................................. 359/764; 359/763
(58) Field of Search .................................... 359/763, 764, 359/754, 755, 756

(56) References Cited

U.S. PATENT DOCUMENTS

| | | | |
|---|---|---|---|
| 5,159,496 | * 10/1992 | Kataoka | 359/754 |
| 5,768,021 | * 6/1998 | Ori | 359/618 |
| 5,920,434 | * 7/1999 | Mori | 359/663 |
| 6,081,384 | * 6/2000 | Mori | 359/637 |

FOREIGN PATENT DOCUMENTS

09113802-A * 5/1997 (JP) .............................. G02B/13/24

OTHER PUBLICATIONS

Japanese Patent Office, Patent Abstracts of Japan, Publication No.: 10235921 A, Date of Publication: Sep. 8, 1998, Application No.: 09038169, Date of Filing: Feb. 21, 1997.

Japanese Patent Office, Patent Abstracts of Japan, Publication No.: 04311912 A, Date of Publication: Nov. 4, 1992, Application No. 03079068, Date of Filing: Apr. 11, 1991, pp. 99–106.

* cited by examiner

Primary Examiner—Gerogia Epps
Assistant Examiner—David N. Spector
(74) Attorney, Agent, or Firm—Ronald R. Snider; Snider & Associates

(57) ABSTRACT

A color image readout lens usable within a magnification range from −0.6X to −1.7X comprises, successively from the object side, a first lens group $G_1$ comprising by a lens having a positive refracting power with a convex surface directed onto the object side, a second lens group $G_2$, comprising by a cemented lens, composed of a biconvex lens and a biconcave lens, having a negative refracting power as a whole with a convex surface directed onto the object side, a third lens group $G_3$, comprising a cemented lens, composed of a biconcave lens and a biconvex lens, having a negative refracting power as a whole with a convex surface directed onto an image side, a fourth lens group $G_4$ comprising a positive lens with a convex surface directed onto the image side, and a fifth lens group $G_5$ comprising a negative meniscus lens with a stronger concave surface directed onto the object side. The color image readout lens further satisfies predetermined conditional expressions.

10 Claims, 16 Drawing Sheets

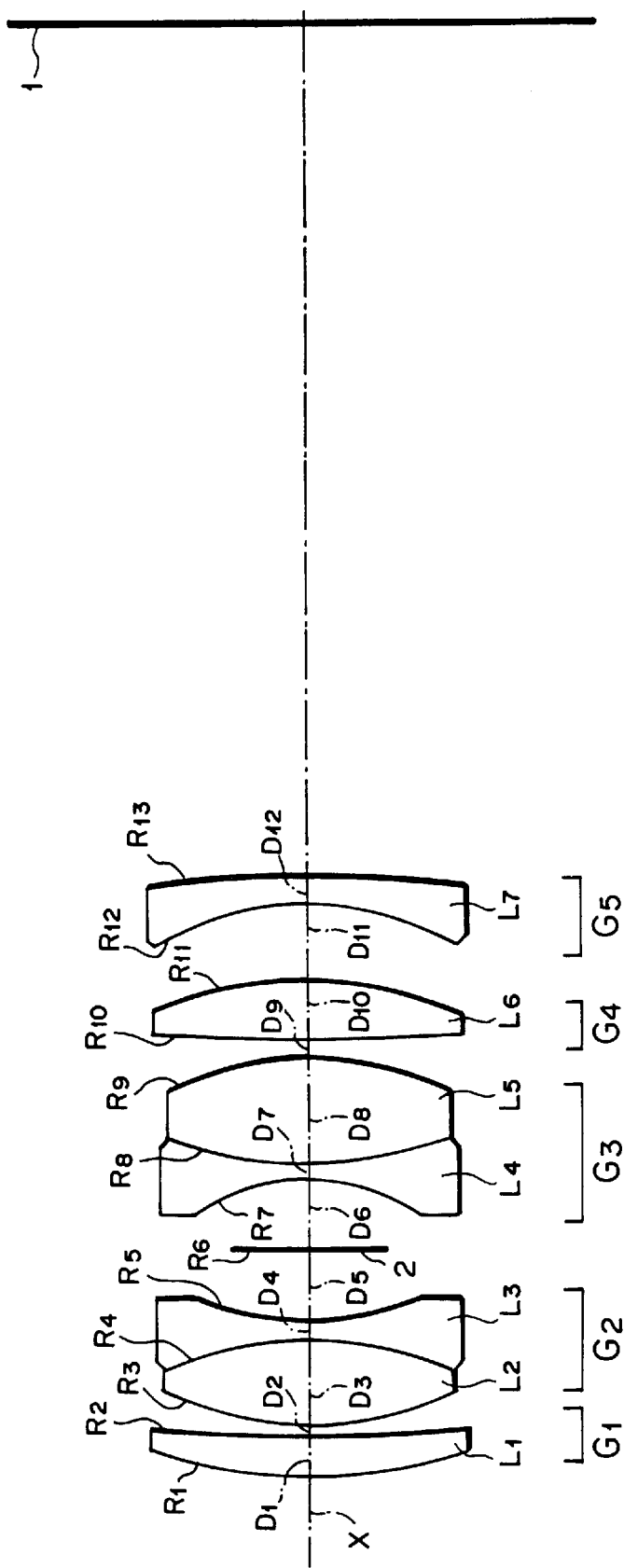
F I G. 1

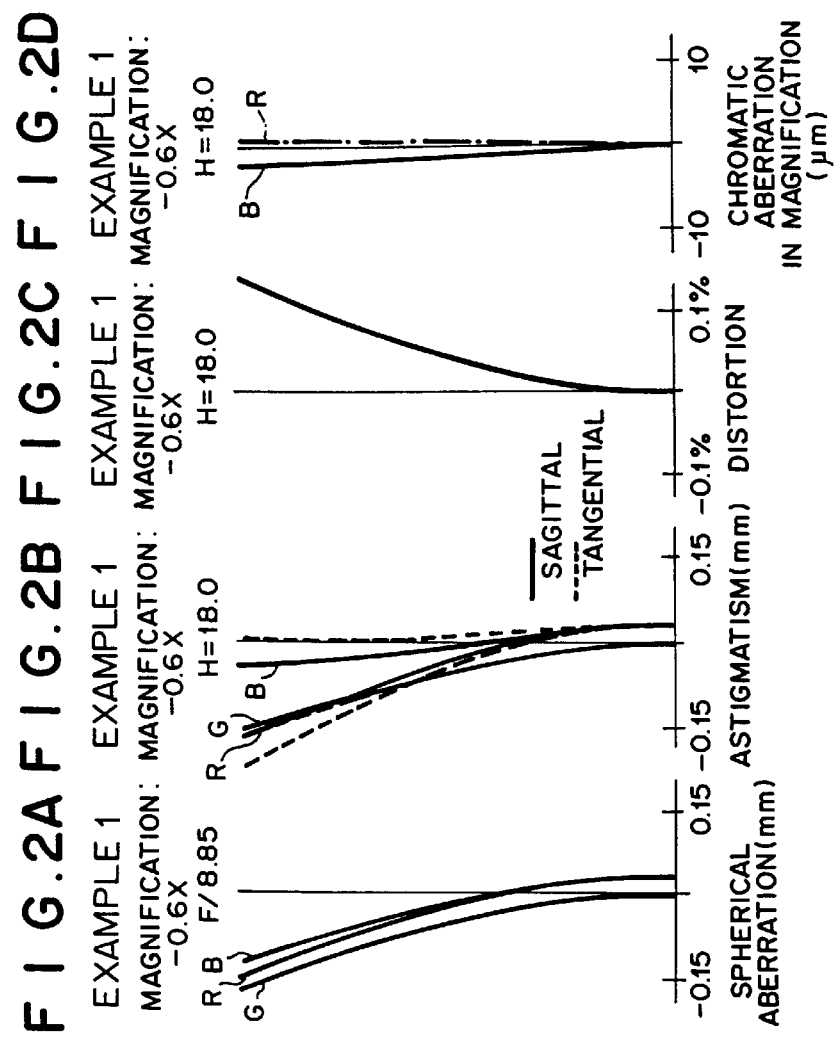

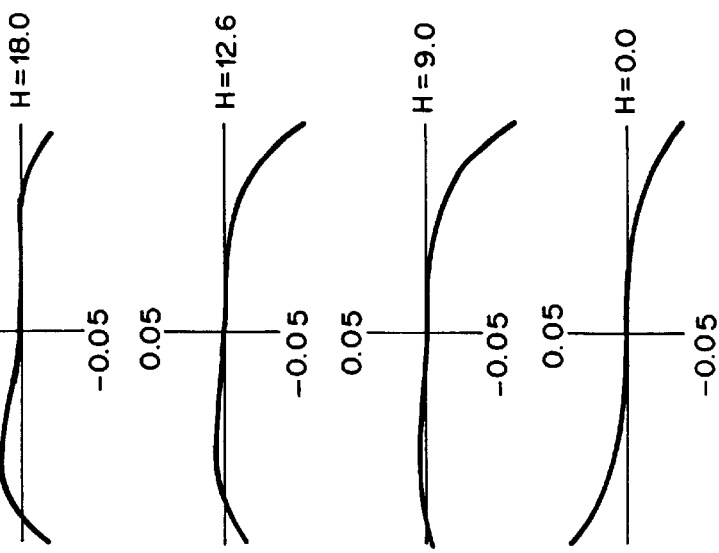
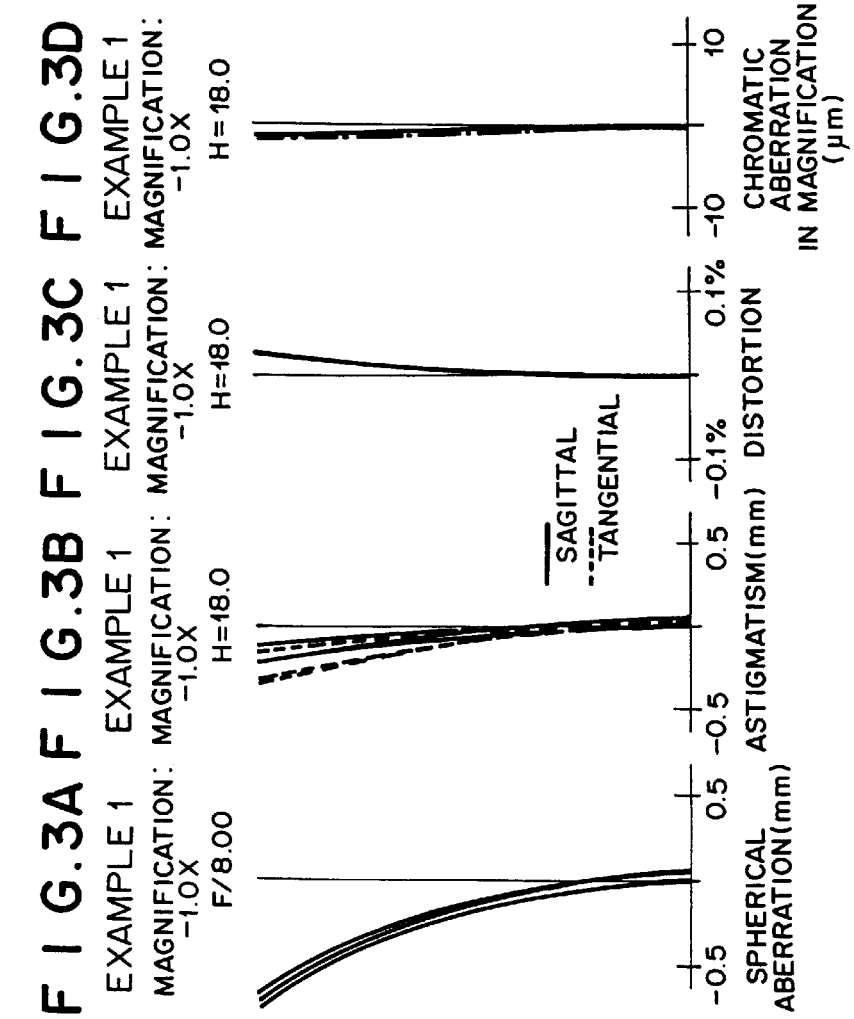

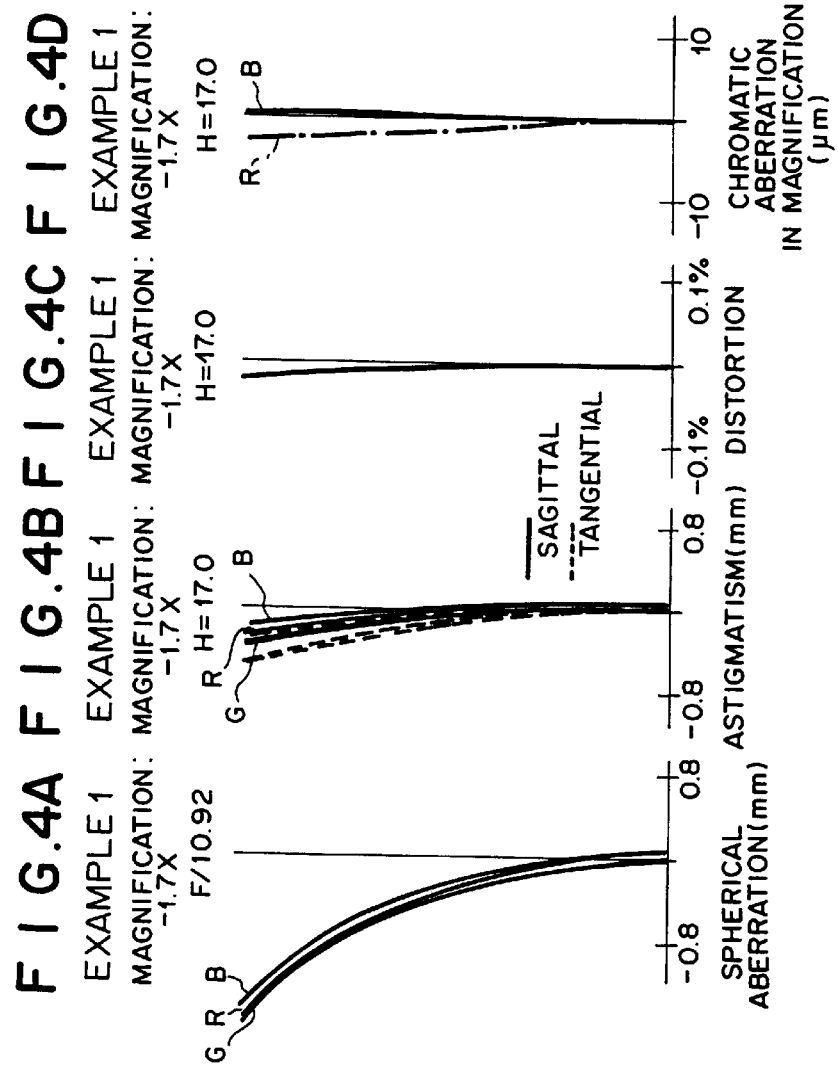

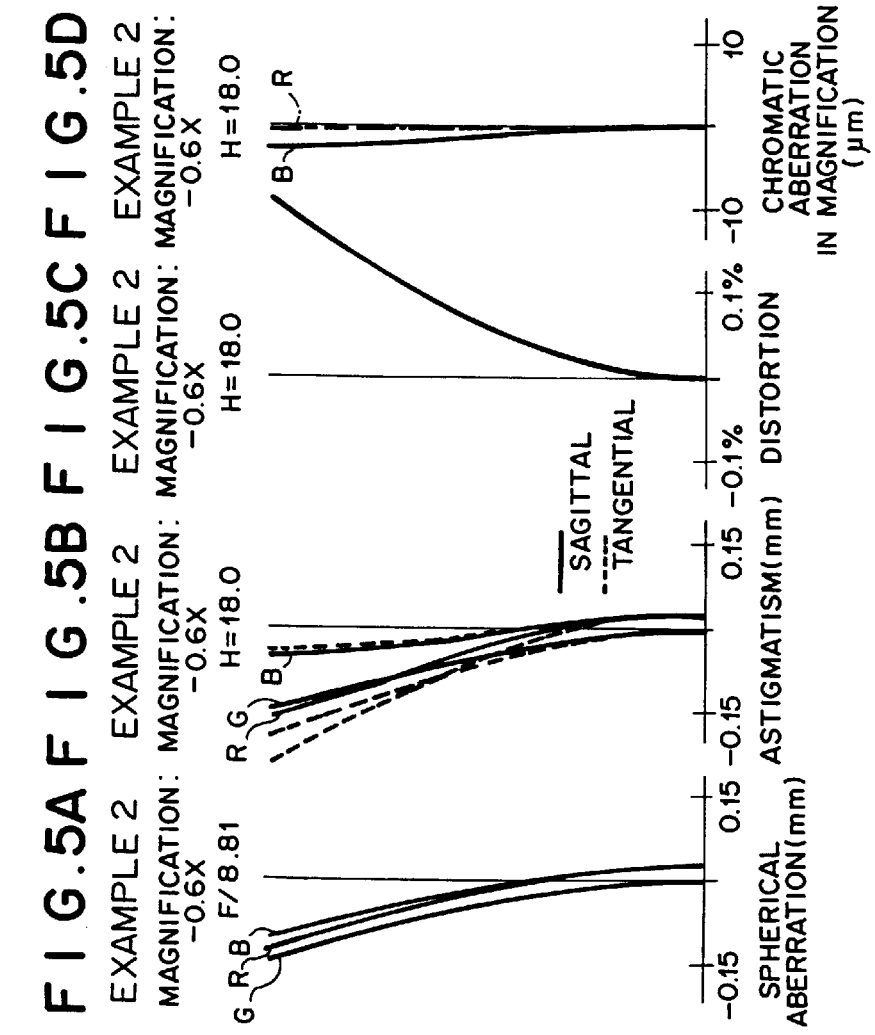

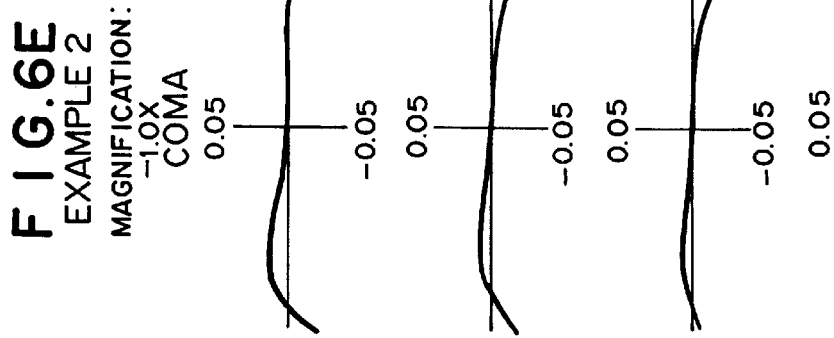
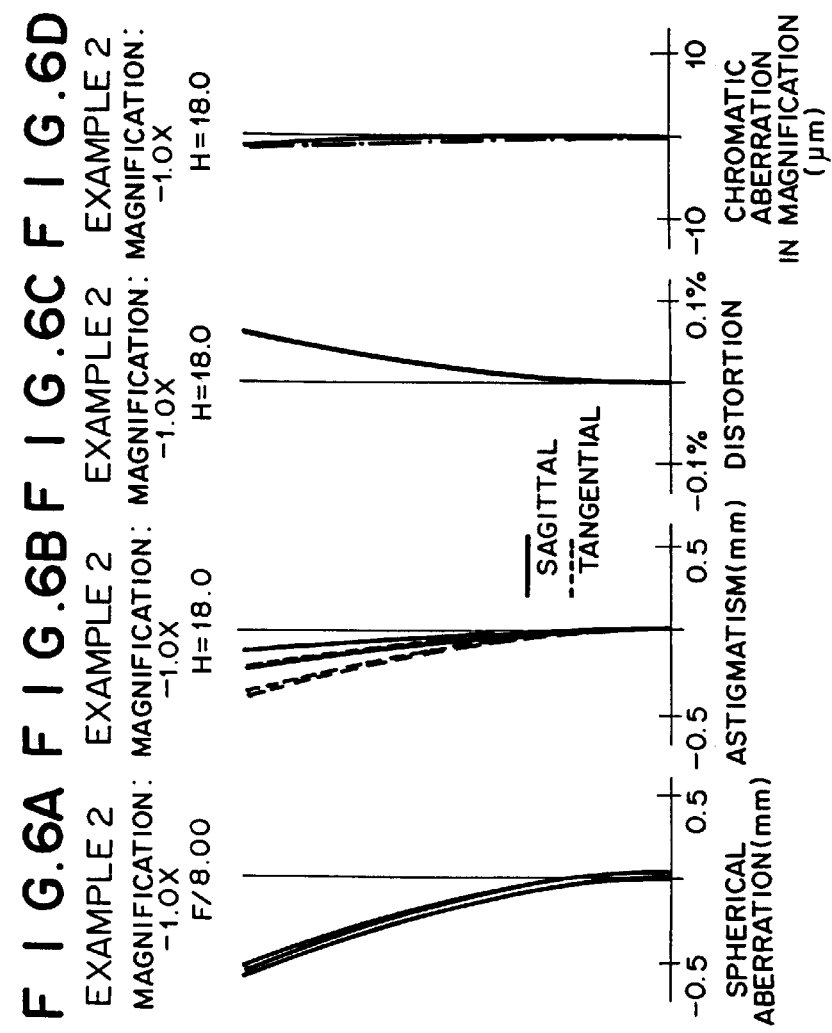

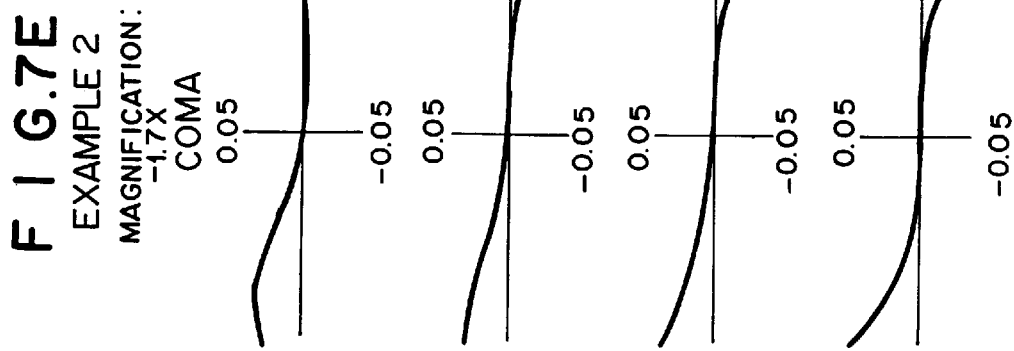
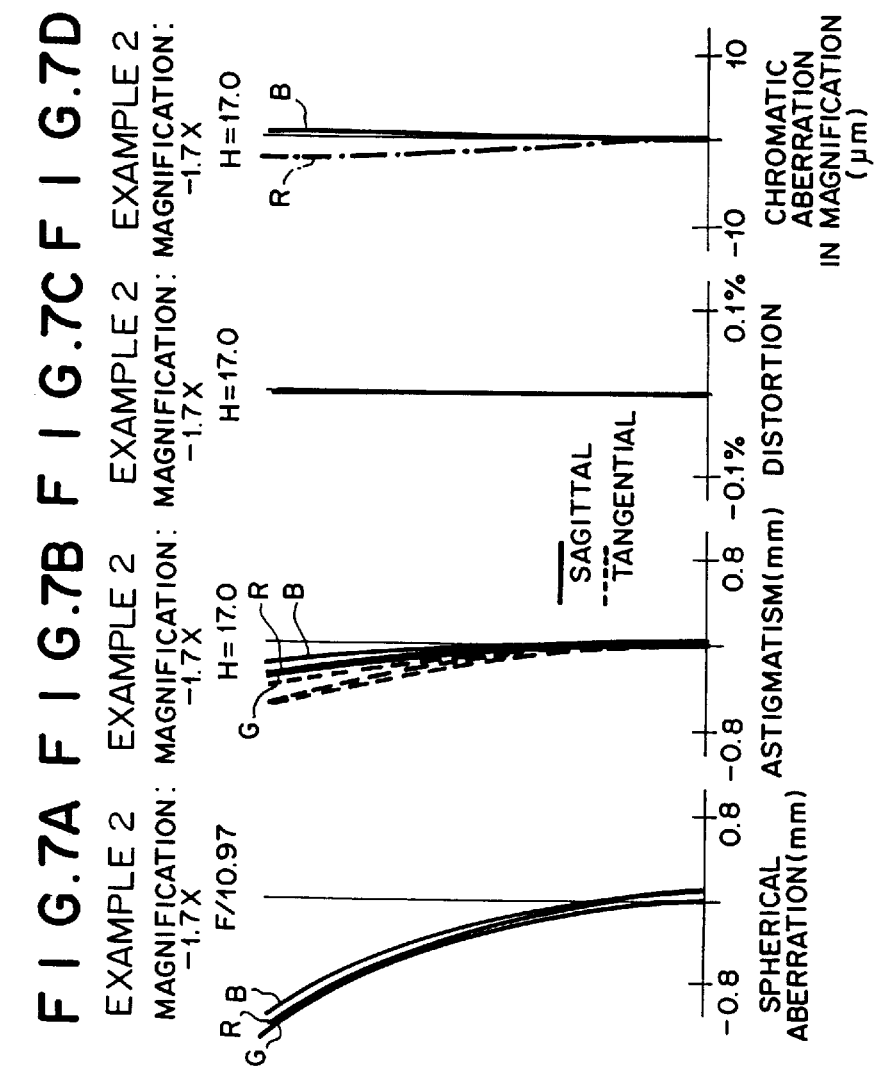

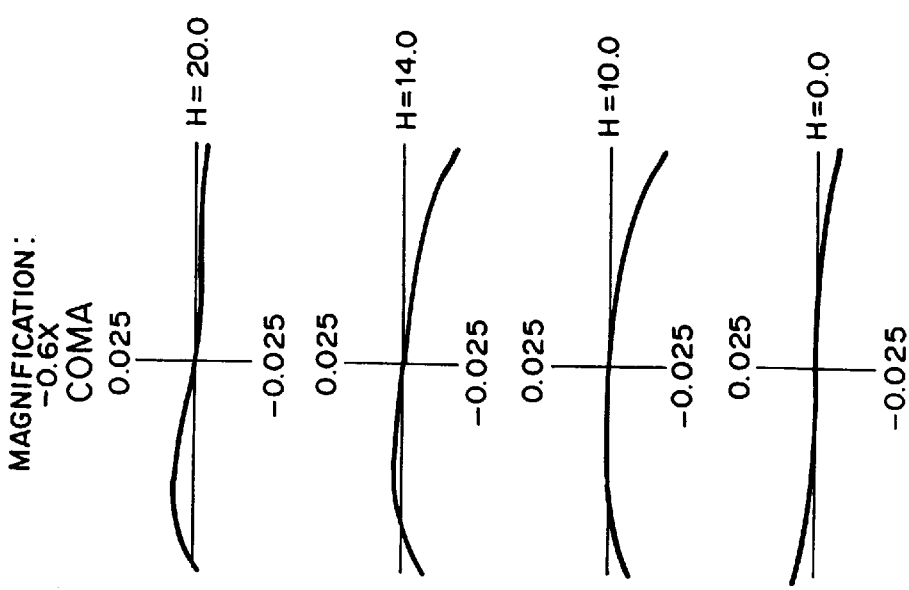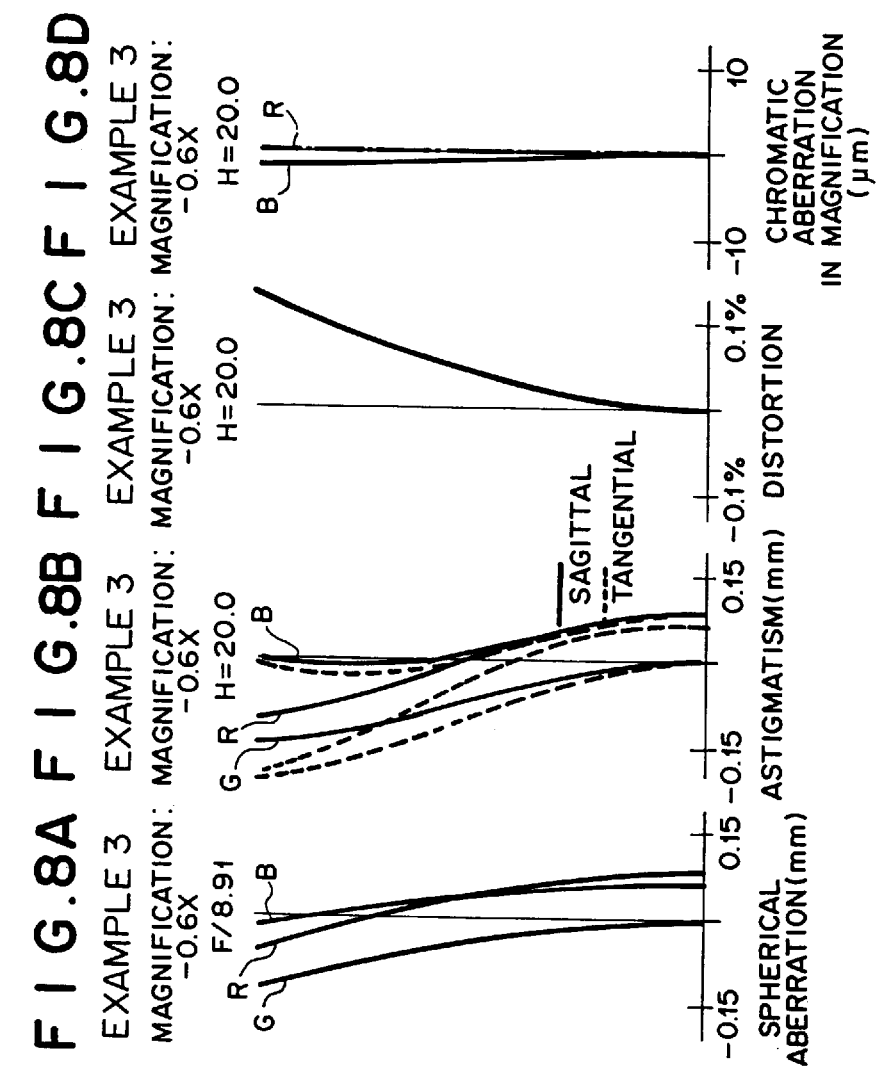

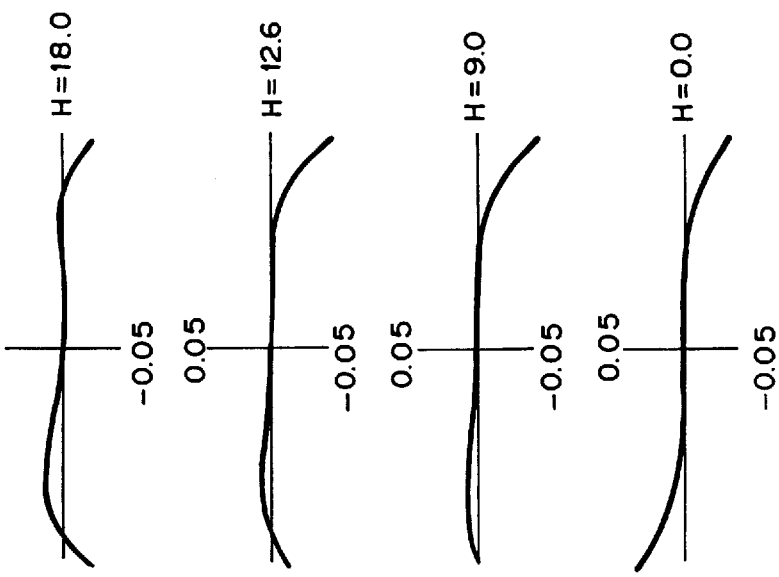
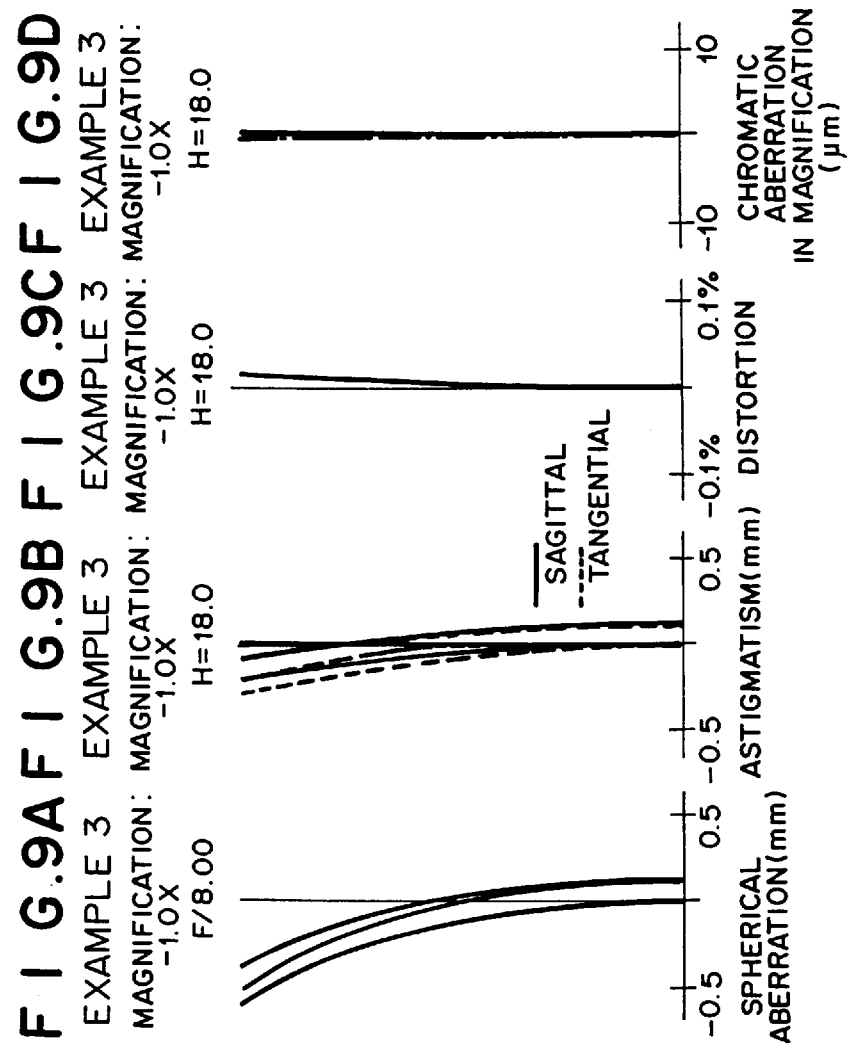

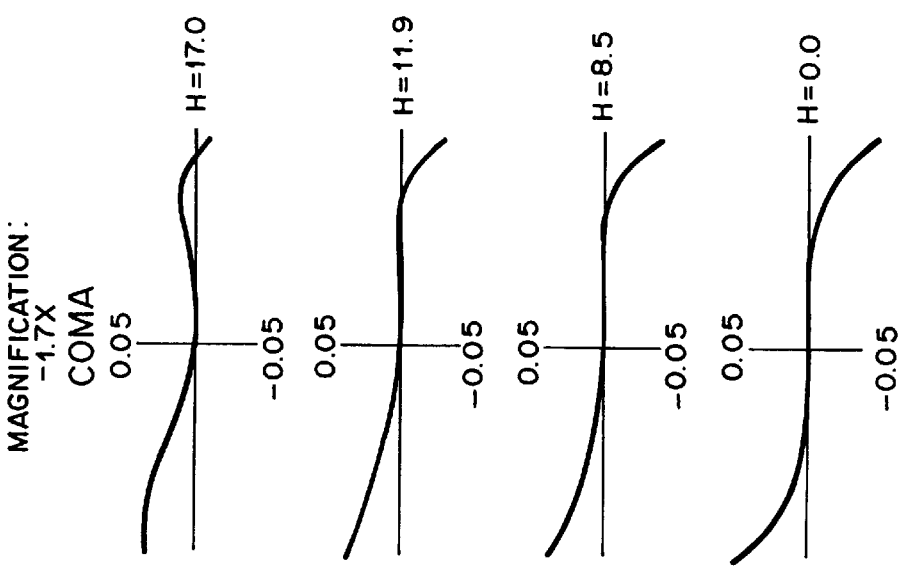
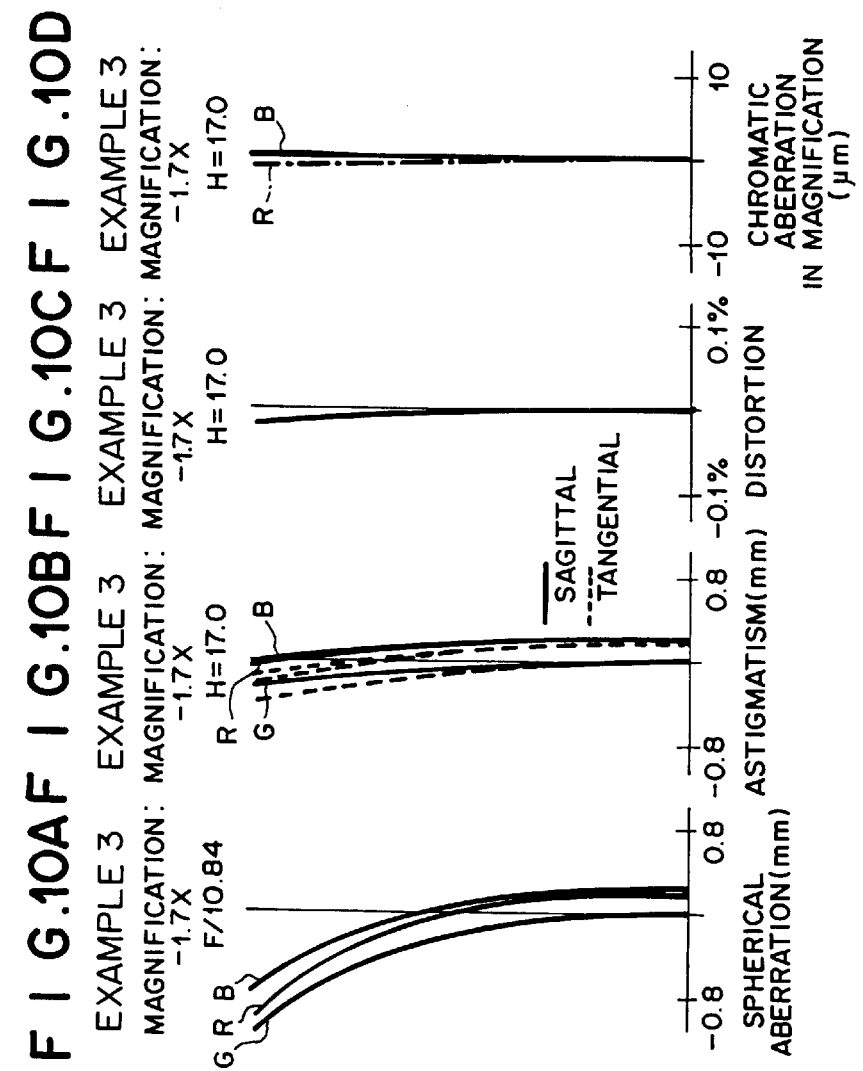

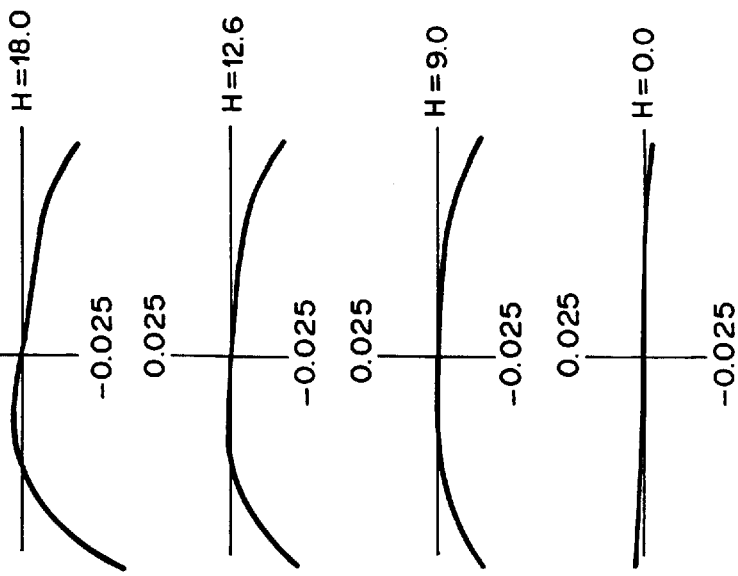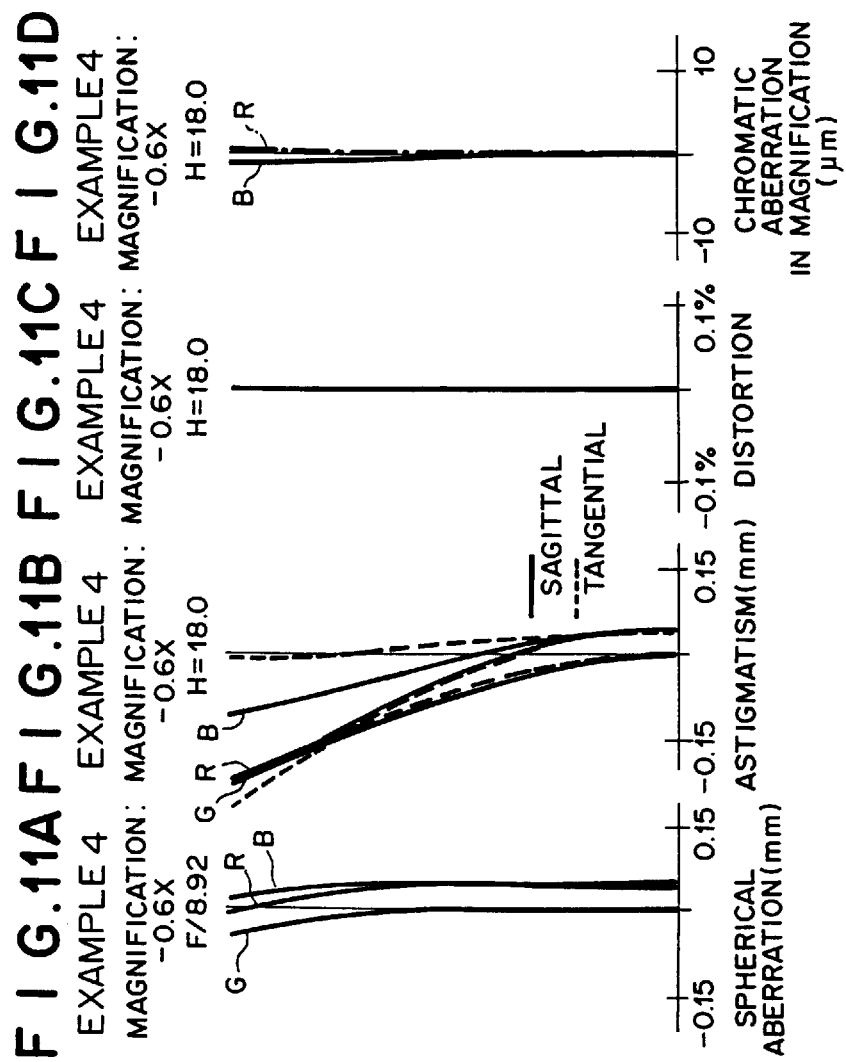

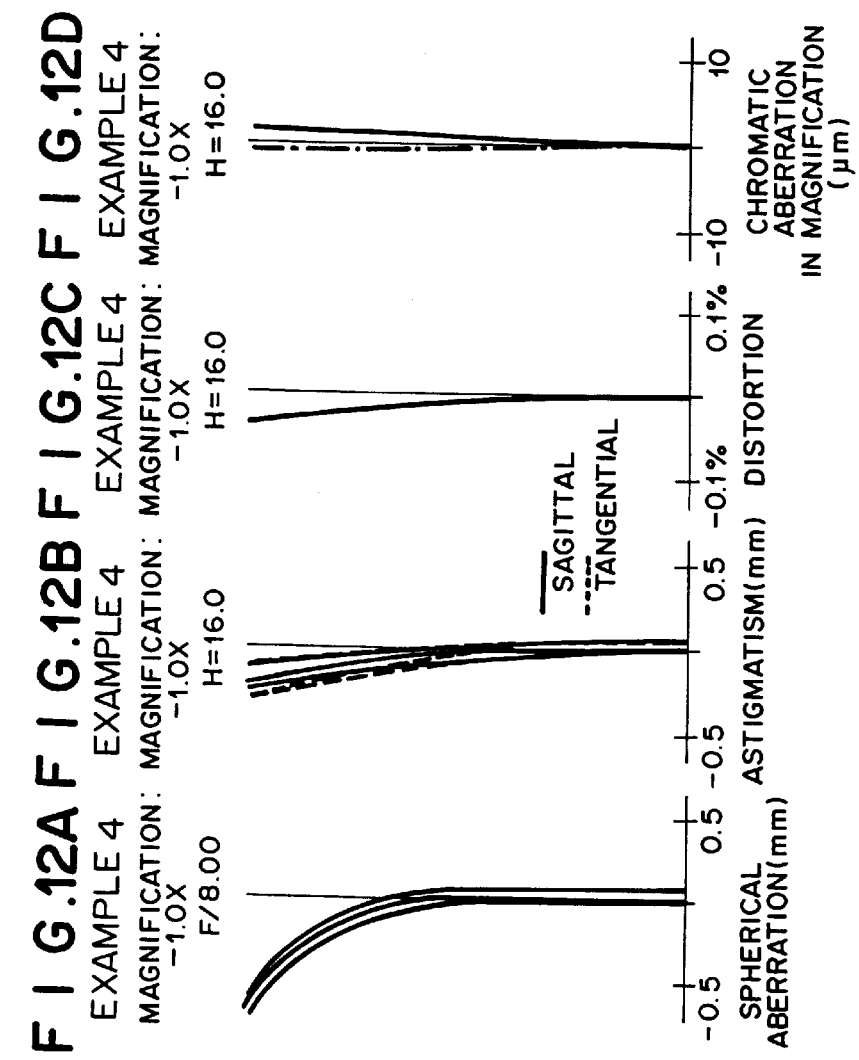

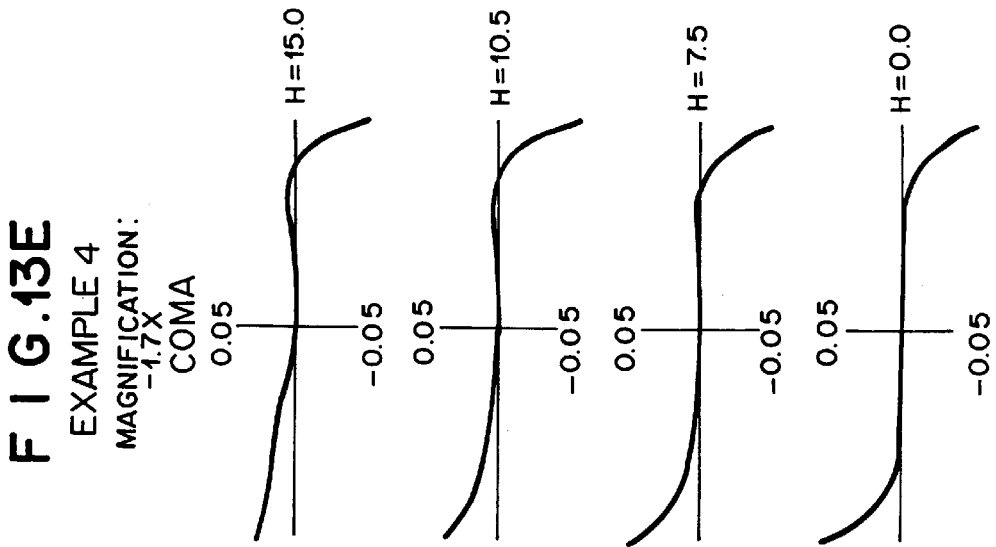

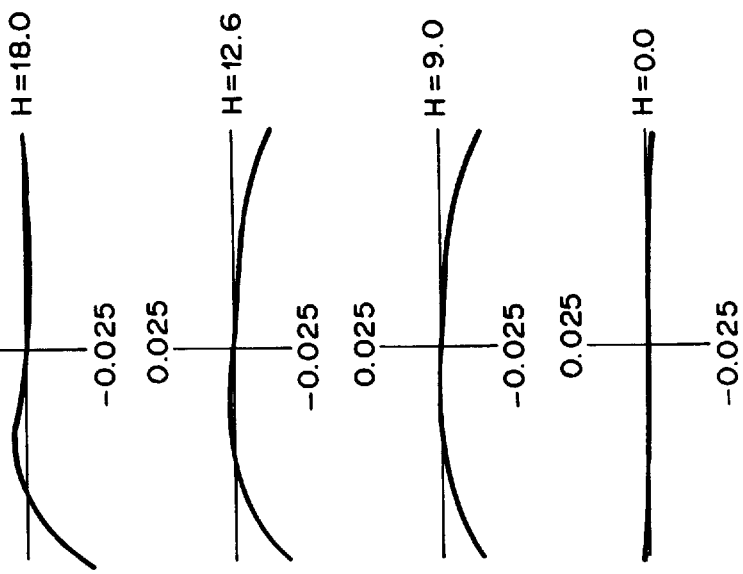
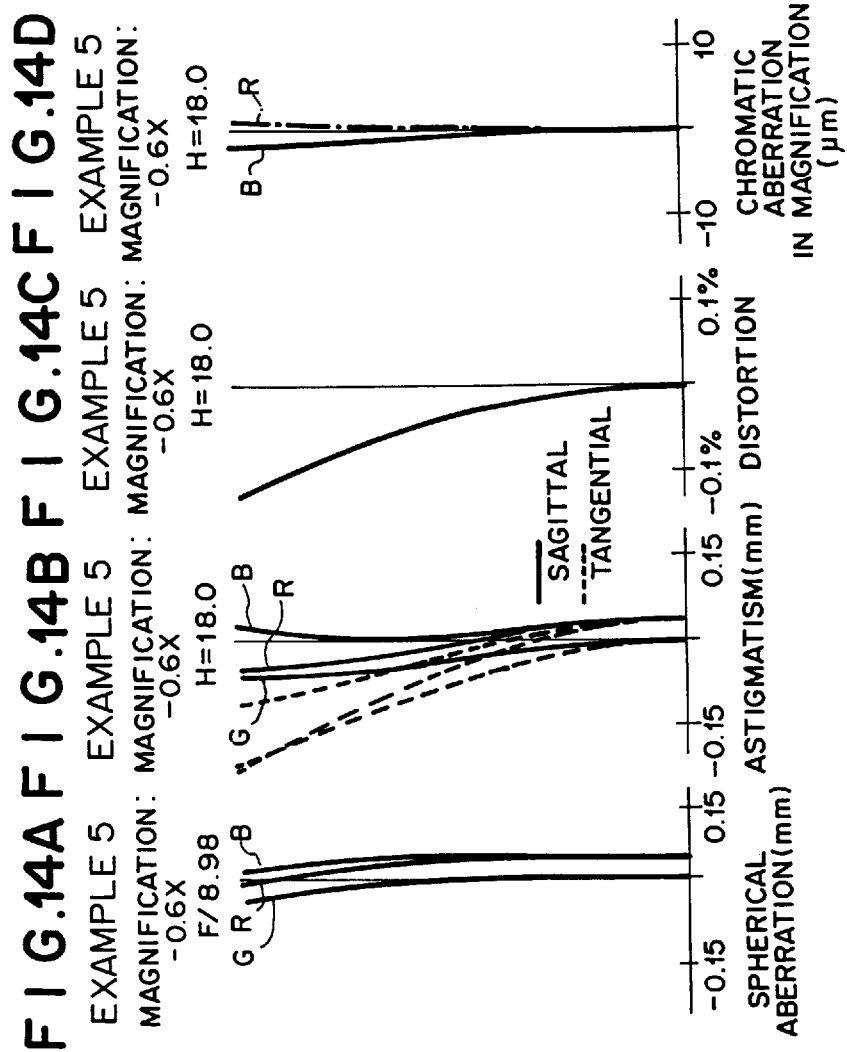

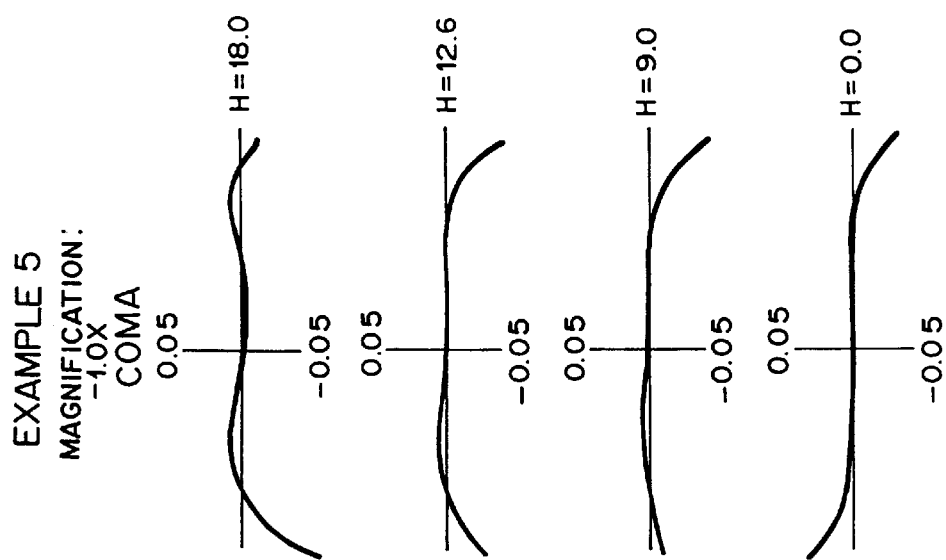
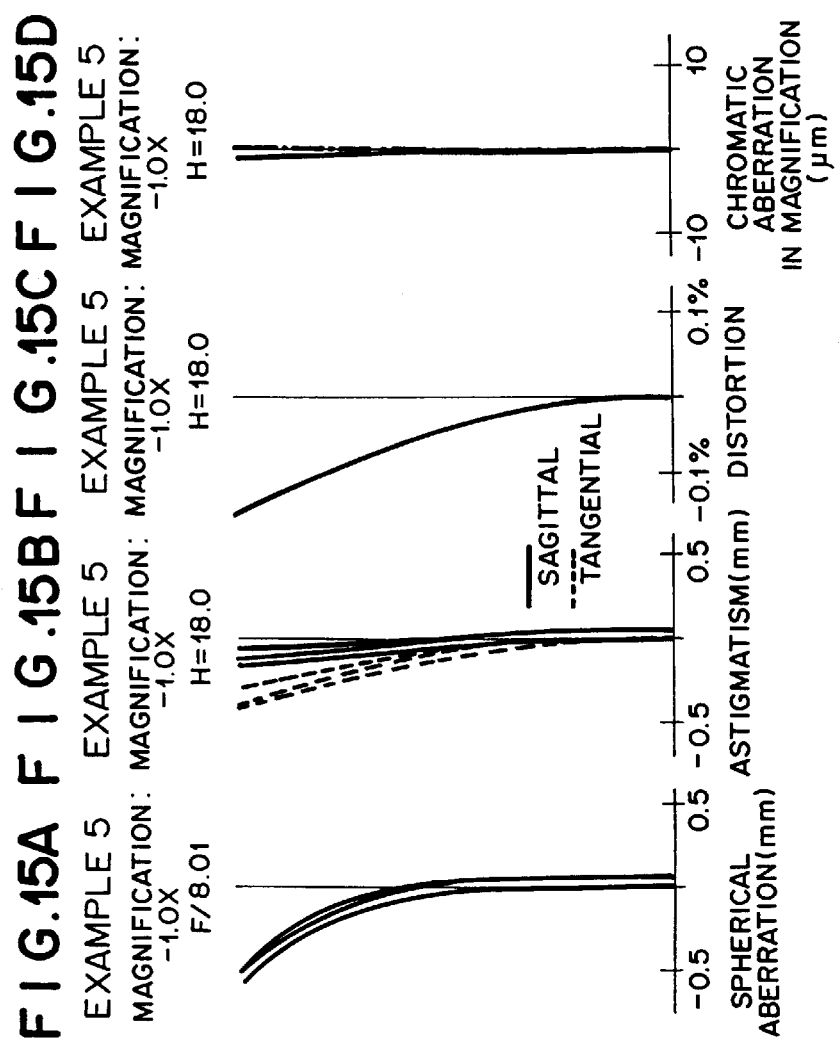

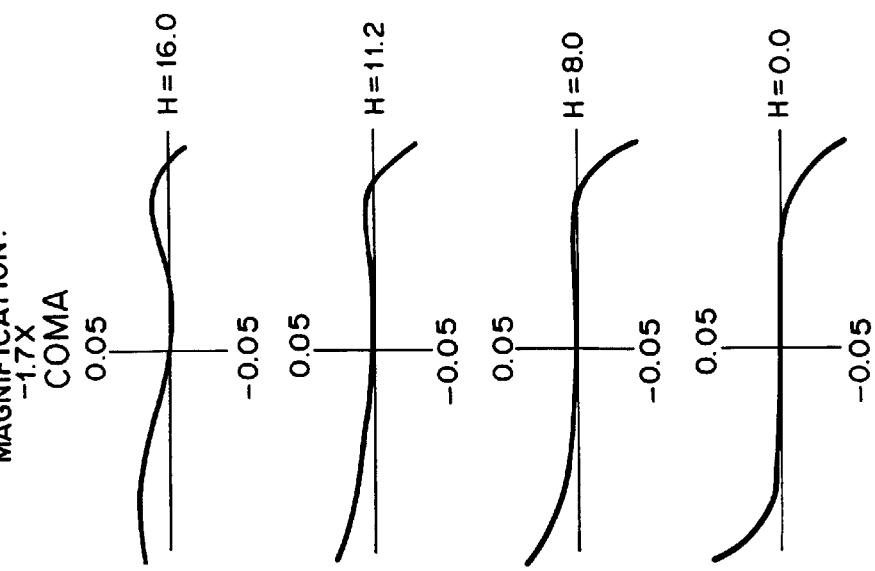
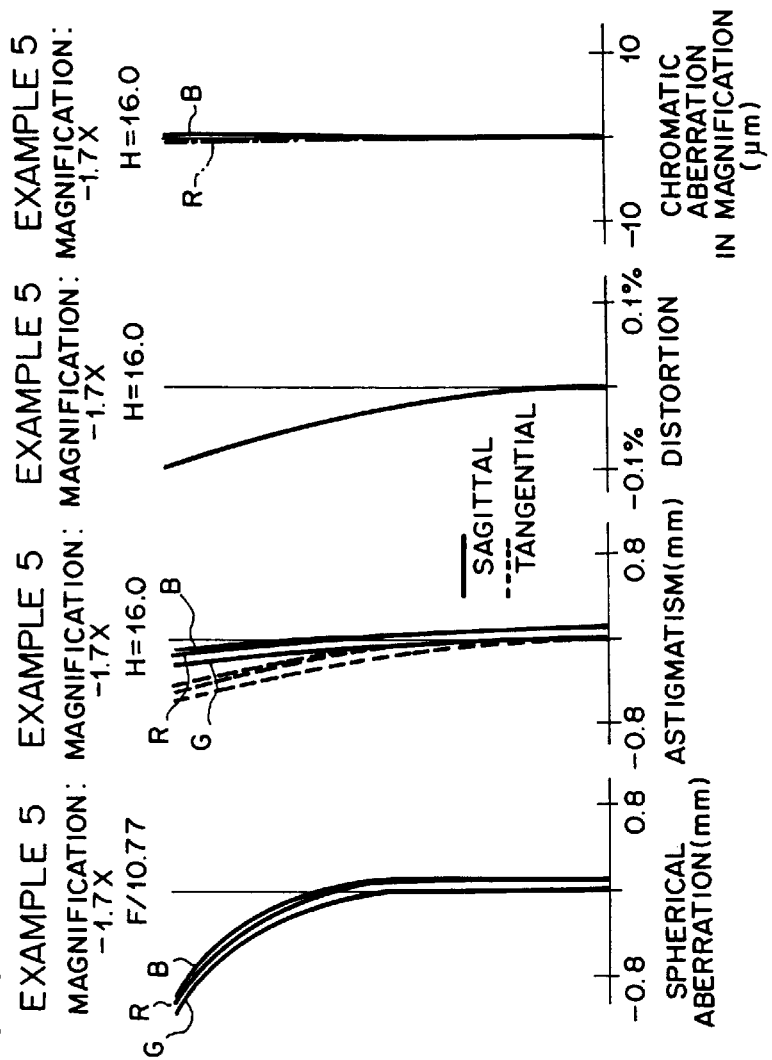

COLOR IMAGE READOUT LENS

RELATED APPLICATIONS

This application claims the priority of Japanese Patent Application No. 11-086417 filed on Mar. 29, 1999, which is incorporated herein by reference.

BACKGROUND OF THE INVENTION

1. Field of the Invention

The present invention relates to a lens for reading out color images or color originals; and, in particular, to a color image readout lens, having a brightness with an effective F number of about 8 to 11, adapted to read out images on negative or positive films over a range of reducing and enlarging magnifications including an actual size.

2. Description of the Prior Art

Recently, developing machines known as mini lab or digital lab has come into widespread use. In these developing machines, images on a film are not directly printed onto paper but once captured on a solid-state imaging device such as CCD by use of a lens, so that they can be subjected to various processes, and then are printed onto paper by use of laser or the like. In such a developing machine, its image readout optical system for forming images onto the solid-state imaging device is required to have a high resolution, since its corresponding light-receiving devices have a high density.

In the case where a color original is read out by a three-line CCD, for example, it is necessary that an achromatizing process be favorably carried out for each color of red (R), green (G), and blue (B) such that their respective imaging positions coincide with each other on the light-receiving surface of sensor, and it is desirable that the individual colors keep substantially the same level of performances on the sensor. Specifically, it is necessary that the axial chromatic aberration and chromatic aberration in magnification of each color of R, G, and B be made smaller, and their imaging points from the image center to peripheries be matched, so that each color forms an image with a high contrast at the same position. If the amount of correction of axial chromatic aberration is small, then the respective image point positions of individual colors may shift from each other. Consequently, even when the individual colors have high imaging performances by themselves, it is hard to reproduce their high performances at the same imaging position. Also, in order to correct them, it is necessary to use such means as a mechanism for separately carrying out focusing for each color, the shifting of the imaging surface according to the amount of chromatic aberration generated, and the like.

On the other hand, letting f be the focal length of a lens, and $\beta(\beta<0)$ be the imaging magnification thereof, the generated amount of axial chromatic aberration ($\Delta S$) has a relationship of $\Delta S \propto (1-\beta)^2 \cdot f$, thus increasing as the focal length is longer or the absolute value of magnification $|\beta|$ is greater. This property is remarkable in lenses using no materials with anomalous dispersion, whereby axial colors may not be corrected sufficiently. In enlargement ranges, in particular, higher resolution and higher contrast of R, G, and B may not be realized in the same image surface. For correcting this large axial chromatic aberration, it is therefore effective to use a material having a large anomalous dispersion. The correcting effect becomes higher as the material has a greater anomalous dispersion, and the correcting force becomes stronger as its refracting power is stronger. When the refracting power is too strong, however, then various aberrations may occur greatly, thereby deteriorating image quality. As a lens system, it is desirable that the value of the product obtained by multiplying the refracting power $\phi_i(=1/f_i)$ of an element using a material with an anomalous dispersion by the anomalous dispersion $\delta\theta_i$ be made greater, so as to further correct other aberrations favorably.

As a conventional technique attempting achromatization, one disclosed in Japanese Unexamined Patent Publication No. 4-311912 or the like has been known.

However, the technique disclosed in the above-mentioned publication is used at a magnification of about −0.2205X, and thus aims at forming images under reduction, and does not aim at correcting a large axial chromatic aberration when forming images under magnification. Therefore, for example, when used within the range from −0.6X to −1.7X including an actual size therein, favorable performances are hard to obtain on the enlarging magnification side in particular.

Japanese Unexamined Patent Publication No. 10-325921, on the other hand, discloses a lens system in which a material with an anomalous dispersion is used for a lens, whereby chromatic aberration is corrected upon forming images under magnification. However, due to restrictions concerning correction of other aberrations, the material with an anomalous dispersion cannot attain a predetermined refracting power or greater. Therefore, it is hard to correct axial chromatic aberration sufficiently, and the correction becomes more difficult when the lens system is used at a greater enlarging magnification. Also, fluctuations in aberration upon power variations are not taken into consideration, whereby favorable performances are hard to obtain over a range from reduced imaging to enlarged imaging.

SUMMARY OF THE INVENTION

In view of such circumstances, it is an object of the present invention to provide a high-resolution color image readout lens usable for reading out color images or color originals, which can effectively and sufficiently correct axial chromatic aberration and, at the same time, maintain favorable properties of other aberrations.

The color image readout lens in accordance with the present invention comprises, successively from an object side, a first lens group constituted by a lens having a positive refracting power with a convex surface directed onto the object side, a second lens group, constituted by a biconvex lens and a biconcave lens cemented thereto, with a convex surface directed onto the object side, a third lens group, constituted by a biconcave lens and a biconvex lens cemented thereto, having a negative refracting power as a whole with a convex surface directed onto an image side, a fourth lens group constituted by a positive lens with a convex surface directed onto the image side, and a fifth lens group constituted by a negative meniscus lens with a stronger concave surface directed onto the object side;

the color image readout lens further satisfying the following conditional expressions (1) to (3):

$$61.5 < \nu_2, \ 0.006 < \delta\theta_2 \quad (1)$$

$$61.5 < \nu_5, \ 0.006 < \delta\theta_5 \quad (2)$$

$$0.06 < (\phi_2/\phi_T) \cdot \delta\theta_2 + (\phi_5/\phi_T) \cdot \delta\theta_5 < 0.14 \quad (3)$$

where $\phi_T$ is the refracting power of the whole system; $\phi_i$, $\nu_i$, and $\delta\theta_i$ are the refracting power, dispersion, and anomalous dispersion with respect to g-d line of the i-th lens from the object side, respectively; $d_j$ is the j-th surface space from the object side; and $\delta\theta$ is the anomalous dispersion defined by the deviation $\delta\theta_{g,d}$ of partial dispersion ratio $\theta_{g,d}$ with respect to g-d line from a reference line; $\phi_T$, $\phi_i$, and $\nu_i$ being obtained at e-line.

Preferably, the color image readout lens in accordance with the present invention further satisfies the following conditional expressions (4) and (5):

$$-0.65 < \phi_7 \cdot d_{6,11} < -0.30 \quad (4)$$

$$-0.030 < \phi_3/d_5 < -0.005 \quad (5)$$

where $d_{6,11}$ is the distance between the 6th and 11th surfaces from the object side.

Preferably, in the image color readout lens in accordance with the present invention, at least one of the lenses having a negative refracting power constituting the second, third, and fifth lens groups satisfies the following the following conditional expression (6):

$$39 < \nu_k < 57, \delta\theta_k < -0.005 \quad (6)$$

where $\nu_k$ and $\delta\theta_k$ are the dispersion and anomalous dispersion with respect to g-d line of the k-th lens from the object side.

Preferably, the cemented lens in the second lens group satisfies the following conditional expression (7):

$$15 < \nu_2 - \nu_3 < 21 \quad (7)$$

where $\nu_2$ is the dispersion of the biconvex lens thereof, and $\nu_3$ is the dispersion of the biconcave lens thereof.

The first lens group may be constituted by a biconvex lens, whereas the fourth lens group may be constituted by a positive meniscus lens.

In imaging with a large axial chromatic aberration such as imaging near actual size or imaging under magnification, using a material with a high anomalous dispersion so as to enhance the refracting power of a lens using this material is quite effective in correcting the axial chromatic aberration. However, enhancing the refracting power of a surface reduces its radius of curvature. If a bright lens is to be attained, then various aberrations such as spherical aberration, coma flare, and curvature of field may occur in this surface, whereby favorable performances cannot be obtained over a wide magnification range. Therefore, in the color image readout lens in accordance with the present invention, a lens having a negative refracting power is added to the image side of a Gauss type lens system, while a lens using a material with a high anomalous dispersion is provided with a high refracting power, so as to achieve the above-mentioned object of correcting axial chromatic aberration and also correcting other aberrations favorably. As a consequence, a bright lens having an effective F number of 8 to 11 and yielding favorable performances in a wide magnification range from −0.6X to −1.7X can be obtained.

BRIEF DESCRIPTION OF THE DRAWINGS

FIG. 1 is a view showing the configuration of a color image readout lens in accordance with a typical example;

FIGS. 2A to 2E are aberration charts showing spherical aberration, astigmatism, distortion, chromatic aberration in magnification, and coma of the color image readout lens in accordance with Example 1 at a magnification of −0.6X, respectively;

FIGS. 3A to 3E are aberration charts showing spherical aberration, astigmatism, distortion, chromatic aberration in magnification, and coma of the color image readout lens in accordance with Example 1 at a magnification of −1.0X, respectively;

FIGS. 4A to 4E are aberration charts showing spherical aberration, astigmatism, distortion, chromatic aberration in magnification, and coma of the color image readout lens in accordance with Example 1 at a magnification of −1.7X, respectively;

FIGS. 5A to 5E are aberration charts showing spherical aberration, astigmatism, distortion, chromatic aberration in magnification, and coma of the color image readout lens in accordance with Example 2 at a magnification of −0.6X, respectively;

FIGS. 6A to 6E are aberration charts showing spherical aberration, astigmatism, distortion, chromatic aberration in magnification, and coma of the color image readout lens in accordance with Example 2 at a magnification of −1.0X, respectively;

FIGS. 7A to 7E are aberration charts showing spherical aberration, astigmatism, distortion, chromatic aberration in magnification, and coma of the color image readout lens in accordance with Example 2 at a magnification of −1.7X, respectively;

FIGS. 8A to 8E are aberration charts showing spherical aberration, astigmatism, distortion, chromatic aberration in magnification, and coma of the color image readout lens in accordance with Example 3 at a magnification of −0.6X, respectively;

FIGS. 9A to 9E are aberration charts showing spherical aberration, astigmatism, distortion, chromatic aberration in magnification, and coma of the color image readout lens in accordance with Example 3 at a magnification of −1.0X, respectively;

FIGS. 10A to 10E are aberration charts showing spherical aberration, astigmatism, distortion, chromatic aberration in magnification, and coma of the color image readout lens in accordance with Example 3 at a magnification of −1.7X, respectively;

FIGS. 11A to 11E are aberration charts showing spherical aberration, astigmatism, distortion, chromatic aberration in magnification, and coma of the color image readout lens in accordance with Example 4 at a magnification of −0.6X, respectively;

FIGS. 12A to 12E are aberration charts showing spherical aberration, astigmatism, distortion, chromatic aberration in magnification, and coma of the color image readout lens in accordance with Example 4 at a magnification of −1.0X, respectively;

FIGS. 13A to 13E are aberration charts showing spherical aberration, astigmatism, distortion, chromatic aberration in magnification, and coma of the color image readout lens in accordance with Example 4 at a magnification of −1.7X, respectively;

FIGS. 14A to 14E are aberration charts showing spherical aberration, astigmatism, distortion, chromatic aberration in magnification, and coma of the color image readout lens in accordance with Example 5 at a magnification of −0.6X, respectively;

FIGS. 15A to 15E are aberration charts showing spherical aberration, astigmatism, distortion, chromatic aberration in magnification, and coma of the color image readout lens in accordance with Example 5 at a magnification of −1.0X, respectively; and FIGS. 16A to 16E are aberration charts showing spherical aberration, astigmatism, distortion, chromatic aberration in magnification, and coma of the color image readout lens in accordance with Example 5 at a magnification of −1.7X, respectively.

DESCRIPTION OF THE PREFERRED EMBODIMENTS

In the following, an embodiment of the imaging lens in accordance with the present invention will be explained with reference to the accompanying drawings.

FIG. 1 is a view showing a lens configuration of the color image readout lens in accordance with an embodiment of the present invention.

This color image readout lens comprises, successively from the object side, a first lens group $G_1$ constituted by a lens having a positive refracting power with a convex surface directed onto the object side; a second lens group $G_2$ constituted by a cemented lens, composed of a biconvex lens and a biconcave lens, with a convex surface directed onto the object side; a third lens group $G_3$ constituted by a cemented lens, composed of a biconcave lens and a biconvex lens, with a convex surface directed onto the image side, having a negative refracting power as a whole; a fourth lens group $G_4$ constituted by a positive lens with a convex surface directed onto the image side; and a fifth lens group $G_5$ constituted by a negative meniscus lens with a stronger concave surface directed onto the object side.

Specifically, the first lens group $G_1$ is constituted by a first lens $L_1$ made of a positive meniscus lens with a convex surface directed onto the object side; the second lens group $G_2$ is constituted by a cemented lens composed of a second lens $L_2$ made of a biconvex lens and a third lens $L_3$ made of a biconcave lens; the third lens group $G_3$ is constituted by a cemented lens composed of a fourth lens $L_4$ made of a biconcave lens and a fifth lens $L_5$ made of a biconvex lens; the fourth lens group $G_4$ is constituted by a biconvex lens with a surface having a greater curvature directed onto the image side; and the fifth lens group $G_5$ is constituted by a negative meniscus lens with a concave surface directed onto the object side. Here, a stop 2 is disposed between the third lens $L_3$ and the fourth lens $L_4$. A luminous flux from the outside having passed through the opening portion of the stop 2 is converged by the convex lenses of the fifth lens $L_5$ and sixth lens $L_6$, so as to form an image on an imaging surface 1 of a solid-state imaging device (CCD).

The lens in accordance with this embodiment is configured so as to satisfy the following conditional expressions (1) to (7):

$$61.5 < \nu_2,\ 0.006 < \delta\theta_2 \tag{1}$$

$$61.5 < \nu_5,\ 0.006 < \delta\theta_5 \tag{2}$$

$$0.06 < (\phi_2/\phi_T)\cdot\delta\theta_2 + (\phi_5/\phi_T)\cdot\delta\theta_5 < 0.14 \tag{3}$$

$$-0.65 < \phi_7 \cdot d_{6,11} < -0.30 \tag{4}$$

$$-0.030 < \phi_3/d_5 < -0.005 \tag{5}$$

$$39 < \nu_k < 57,\ \delta\theta_k < -0.005 \tag{6}$$

$$15 < \nu_2 - \nu_3 < 21 \tag{7}$$

where $\phi_T$ is the refracting power of the whole system; $\phi_i$, $\nu_i$, and $\delta\theta_i$ are the refracting power, dispersion, and anomalous dispersion with respect to g-d line of the i-th lens from the object side, respectively; $d_j$ is the j-th surface space from the object side; $d_{6,11}$ is the distance between the 6th and 11th surfaces from the object side; $\delta\theta$ is the anomalous dispersion defined by the deviation $\delta\theta_{g,d}$ of partial dispersion ratio $\theta_{g,d}$ with respect to g-d line from a reference line; $\nu_k$ and $\delta\theta_{g,d}$ are the dispersion and anomalous dispersion with respect to g-d line of the k-th lens from the object side having a negative refracting power, respectively; $\phi_T$, $\phi_i$, and $\nu_i$ being obtained at e-line. Here, in particular, $\nu_2$ is the dispersion of the second lens $L_2$, whereas $\mu_3$ is the dispersion of the third lens $L_3$.

Technical significance of the above-mentioned conditional expressions (1) to (7) will now be explained.

Conditional expressions (1), (2), and (3) define conditions concerning chromatic aberration, and those for favorably correcting axial chromatic aberration in particular.

Conditional expressions (1) and (2) indicate that a glass material having an anomalous dispersion with a deviation in a positive direction from a reference line is employed as the positive lenses $L_2$, $L_5$ of the second lens group $G_2$ and third lens group $G_3$, each constituted as a cemented lens. When refracting powers are distributed so as to satisfy these conditional expressions (1), (2) as well as conditional expression (3), a large axial chromatic aberration occurring at an enlarging magnification can be corrected, and fluctuations in chromatic aberration in magnification upon power variations can also be made smaller.

Outside the ranges of the above-mentioned conditional expressions (1), (2), the refracting power of the positive lens components in the cemented lenses becomes too strong in order to correct the large axial chromatic aberration occurring at enlarging magnifications, so that negative spherical aberration and coma flare may increase, thus making it harder to attain high-resolution performances.

If the lower limit of conditional expression (3) is not satisfied, then the amount of correction for axial chromatic aberration may be insufficient, whereby it becomes difficult to attain high-resolution, high contrast images in three colors of R, G, and B. If the upper limit is exceeded, by contrast, then, while axial chromatic aberration can be corrected favorably, each lens lowers its radius of curvature, whereby negative spherical aberration may increase if a bright lens is to be obtained, and coma flare and curvature of field may occur outside the axis as well, thus making it difficult to attain favorable performances.

The above-mentioned conditional expression (4) is a condition defining the refracting power and position of the seventh lens $L_7$ disposed closest to the image, and is a condition for favorably correcting off-axis coma. If the seventh lens $L_7$ is disposed so as to satisfy conditional expression (4), then fluctuations in coma of off-axis luminous fluxes upon power variations can be made smaller. If the seventh lens $L_7$ is located so close to the stop 2 that the lower limit of conditional expression (4) is not satisfied, then it becomes harder to separate axial and off-axis aberration corrections from each other. In particular, it becomes difficult to correct spherical aberration and off-axis coma with a favorable balance at the same time. If the refracting power of the seventh lens $L_7$ is so strong that the upper limit is exceeded, then coma flare and curvature of field in off-axis luminous fluxes with respect to angles of view corresponding to marginal portions of the lens may enhance to such an extent that they are hard to correct.

The above-mentioned conditional expression (5) defines the refracting power of the third lens $L_3$ with respect to the surface space between the third lens $L_3$ and the stop 2, thereby defining the refracting power and position of the second lens group $G_2$. Outside the range of conditional expression (5), coma flare of off-axis luminous fluxes may increase so much that high-resolution performances are hard to obtain. If the distance between the third lens $L_3$ and the stop 2 becomes smaller, then off-axis luminous fluxes transmitted through the second lens group $G_2$ can pass near the optical axis X, whereby the radius of curvature of each lens surface in the second lens group $G_2$ can be reduced. This case is advantageous in terms of correcting axial chromatic aberration, since each lens has a stronger refracting power. If this correction is in excess such that the radius of curvature becomes too small, then coma flare in off-axis luminous fluxes increases drastically. If the distance between the third lens $L_3$ and the stop 2 is widened, by contrast, then off-axis luminous fluxes transmitted through the second lens group $G_2$ will pass it through at positions distanced from the optical axis. Since each lens in the second lens group $G_2$ has an appropriate refracting power for correcting axial chromatic aberration, coma flare increases when the height at which light beams pass exceeds a predetermined level.

The above-mentioned conditional expression (6) is a condition for using, as lenses having a negative refracting power, an anomalous dispersion glass material having a negative deviation from a reference line. If this condition is satisfied, then lenses having a negative refracting power can also partake in correction of axial chromatic aberration. Therefore, lenses having a positive refracting power can reduce their burden of correcting axial chromatic aberration, whereby each surface of the lenses having a positive refracting power can enhance its degree of freedom in designing the radius of curvature, thus becoming advantageous in terms of aberration correction.

The above-mentioned conditional expression (7) is a conditional expression for favorably correcting chromatic aberration and curvature of field. If a material capable of satisfying conditional expression (7) is chosen, then the secondary spectrum of axial chromatic aberration can be corrected more advantageously. Further, even when each lens has a strong refracting power, a combination of achromatic materials with less curvature of field can be obtained as long as conditional expression (7) is satisfied.

Examples of the present invention will now be explained with reference to specific data.

EXAMPLE 1

The upper part of Table 1 (following) shows the values of radius of curvature R of each lens surface, axial surface space of each lens (center thickness of each lens and air space between each pair of lenses) D, refractive index $N_e$ and Abbe number $v_e$ of each lens at e-line, and anomalous dispersion $\delta\theta$ of each lens in the color image readout lens in accordance with Example 1. In Table 1 and its subsequent Tables, numbers referring to each symbol successively increase from the object side.

The lower part of Table 1 shows the respective refracting power values of the whole system, second lens $L_2$, fifth lens $L_5$, seventh lens $L_7$, and third lens $L_3$ in Example 1, and the respective values corresponding to the above-mentioned conditional expressions.

From Table 1, it can be seen that Example 1 is a color image readout lens satisfying conditional expressions (1) to (7).

FIGS. 2A to 2E, 3A to 3E, and 4A to 4E are sets of aberration charts showing spherical aberration, astigmatism, distortion, chromatic aberration in magnification, and coma of the color image readout lens in accordance with Example 1 at magnifications of −0.6X, −1.0X, and −1.7X, respectively. As can be seen from these charts, this example can yield a color image readout lens which effectively corrects axial chromatic aberration and has high performances over a wide wavelength region.

EXAMPLE 2

The upper part of Table 2 (following) shows the values of radius of curvature R of each lens surface, axial surface space of each lens (center thickness of each lens and air space between each pair of lenses) D, refractive index $N_e$ and Abbe number $v_e$ of each lens at e-line, and anomalous dispersion $\delta\theta$ of each lens in the color image readout lens in accordance with Example 2.

The lower part of Table 2 shows the respective refracting power values of the whole system, second lens $L_2$, fifth lens $L_5$, seventh lens $L_7$, and third lens $L_3$ in Example 2, and the respective values corresponding to the above-mentioned conditional expressions.

From Table 2, it can be seen that Example 2 is a color image readout lens satisfying conditional expressions (1) to (7).

FIGS. 5A to 5E, 6A to 6E, and 7A to 7E are sets of aberration charts showing spherical aberration, astigmatism, distortion, chromatic aberration in magnification, and coma of the color image readout lens in accordance with Example 2 at magnifications of −0.6X, −1.0X, and −1.7X, respectively. As can be seen from these charts, this example can yield a color image readout lens which effectively corrects axial chromatic aberration and has high performances over a wide wavelength region.

EXAMPLE 3

The upper part of Table 3 (following) shows the values of radius of curvature R of each lens surface, axial surface space of each lens (center thickness of each lens and air space between each pair of lenses) D, refractive index $N_e$ and Abbe number $v_e$ of each lens at e-line, and anomalous dispersion $\delta\theta$ of each lens in the color image readout lens in accordance with Example 3.

The lower part of Table 3 shows the respective refracting power values of the whole system, second lens $L_2$, fifth lens $L_5$, seventh lens $L_7$, and third lens $L_3$ in Example 3, and the respective values corresponding to the above-mentioned conditional expressions.

From Table 3, it can be seen that Example 3 is a color image readout lens satisfying conditional expressions (1) to (7).

FIGS. 8A to 8E, 9A to 9E, and 10A to 10E are sets of aberration charts showing spherical aberration, astigmatism, distortion, chromatic aberration in magnification, and coma of the color image readout lens in accordance with Example 3 at magnifications of −0.6X, −1.0X, and −1.7X, respectively. As can be seen from these charts, this example can yield a color image readout lens which effectively corrects axial chromatic aberration and has high performances over a wide wavelength region.

EXAMPLE 4

The upper part of Table 4 (following) shows the values of radius of curvature R of each lens surface, axial surface space of each lens (center thickness of each lens and air space between each pair of lenses) D, refractive index $N_e$ and Abbe number $v_e$ of each lens at e-line, and anomalous dispersion $\delta\theta$ of each lens in the color image readout lens in accordance with Example 4.

The lower part of Table 4 shows the respective refracting power values of the whole system, second lens $L_2$, fifth lens $L_5$, seventh lens $L_7$, and third lens $L_3$ in Example 4, and the respective values corresponding to the above-mentioned conditional expressions.

From Table 4, it can be seen that Example 4 is a color image readout lens satisfying conditional expressions (1) to (5).

FIGS. 11A to 11E, 12A to 12E, and 13A to 13E are sets of aberration charts showing spherical aberration, astigmatism, distortion, chromatic aberration in magnification, and coma of the color image readout lens in accordance with Example 4 at magnifications of −0.6X, −1.0X, and −1.7X, respectively. As can be seen from these charts, this example can yield a color image readout lens which effectively corrects axial chromatic aberration and has high performances over a wide wavelength region.

EXAMPLE 5

The upper part of Table 5 (following) shows the values of radius of curvature R of each lens surface, axial surface space of each lens (center thickness of each lens and air space between each pair of lenses) D, refractive index $N_e$ and Abbe number $\nu_e$ of each lens at e-line, and anomalous dispersion $\delta\theta$ of each lens in the color image readout lens in accordance with Example 5.

The lower part of Table 5 shows the respective refracting power values of the whole system, second lens $L_2$, fifth lens $L_5$, seventh lens $L_7$, and third lens $L_3$ in Example 5, and the respective values corresponding to the above-mentioned conditional expressions.

From Table 5, it can be seen that Example 5 is a color image readout lens satisfying conditional expressions (1) to (7).

FIGS. 14A to 14E, 15A to 15E, and 16A to 16E are sets of aberration charts showing spherical aberration, astigmatism, distortion, chromatic aberration in magnification, and coma of the color image readout lens in accordance with Example 5 at magnifications of −0.6X, −1.0X, and −1.7X, respectively. As can be seen from these charts, this example can yield a color image readout lens which effectively corrects axial chromatic aberration and has high performances over a wide wavelength region.

The color image readout lens in accordance with the present invention is not restricted to those of the above-mentioned examples. The form, radius of curvature of lens surface, axial surface space, refractive index, Abbe number, refracting power, and the like of each lens can be modified in various manners as long as the above-mentioned conditions are satisfied. For example, the first lens group may be constituted by a biconvex lens, whereas the fourth lens group may be constituted by a positive meniscus lens.

In the color image readout lens in accordance with the present invention, as explained in the foregoing, a lens having a negative refracting power is added to the image side of a Gauss type lens system, while a lens using a material with a high anomalous dispersion is provided with a high refracting power, so that, while axial chromatic aberration is corrected, other aberrations are corrected favorably. As a consequence, a bright lens having an effective F number of 8 to 11 and favorable performances in a wide magnification range from −0.6X to −1.7X can be obtained.

TABLE 1

| Surface | R | D | $N_e$ | $\nu_e$ | $\delta\theta$ |
|---|---|---|---|---|---|
| 1 | 41.871 | 2.60 | 1.48915 | 70.1 | 0.0378 |
| 2 | 109.44 | 0.90 | | | |
| 3 | 21.694 | 6.66 | 1.57098 | 70.9 | 0.0233 |
| 4 | −21.694 | 1.20 | 1.51678 | 54.3 | −0.0058 |
| 5 | 21.884 | 4.80 | | | |
| 6 | ∞ | 4.80 | | | |
| 7 | −12.481 | 1.21 | 1.57046 | 42.5 | −0.0014 |
| 8 | 29.779 | 6.70 | 1.57098 | 70.9 | 0.0233 |
| 9 | −19.434 | 1.15 | | | |
| 10 | 116.28 | 4.60 | 1.70557 | 41.0 | 0.0018 |
| 11 | −24.637 | 4.80 | | | |
| 12 | −19.075 | 2.20 | 1.61669 | 44.0 | −0.0115 |
| 13 | −85.878 | | | | |
| $\phi$T | | 0.0177 | (3) | | 0.13 |
| $\phi$2 | | 0.0497 | (4) | | −0.58 |
| $\phi$5 | | 0.0462 | (5) | | −0.010 |
| $\phi$7 | | −0.0248 | (6) | | 3rd, 7th |
| $\phi$3 | | −0.0479 | (7) | | 16.6 |

TABLE 2

| Surface | R | D | $N_e$ | $\nu_e$ | $\delta\theta$ |
|---|---|---|---|---|---|
| 1 | 33.473 | 3.00 | 1.49845 | 81.0 | 0.0368 |
| 2 | 113.55 | 0.25 | | | |
| 3 | 21.329 | 6.01 | 1.57098 | 70.9 | 0.0233 |
| 4 | −25.587 | 1.20 | 1.51678 | 54.3 | −0.0058 |
| 5 | 19.134 | 5.00 | | | |
| 6 | ∞ | 5.00 | | | |
| 7 | −13.213 | 1.21 | 1.57046 | 42.5 | −0.0014 |
| 8 | 30.104 | 7.49 | 1.57098 | 70.9 | 0.0233 |
| 9 | −21.34 | 1.14 | | | |
| 10 | 118.84 | 4.20 | 1.70557 | 41.0 | 0.0018 |
| 11 | −26.393 | 5.42 | | | |
| 12 | −19.999 | 2.04 | 1.61669 | 44.0 | −0.0115 |
| 13 | −83.114 | | | | |
| $\phi$T | | 0.0177 | (3) | | 0.12 |
| $\phi$2 | | 0.0468 | (4) | | −0.57 |
| $\phi$5 | | 0.0433 | (5) | | −0.010 |
| $\phi$7 | | −0.0231 | (6) | | 3rd, 7th |
| $\phi$3 | | −0.0476 | (7) | | 16.6 |

TABLE 3

| Surface | R | D | $N_e$ | $\nu_e$ | $\delta\theta$ |
|---|---|---|---|---|---|
| 1 | 26.404 | 2.70 | 1.48915 | 70.1 | 0.0020 |
| 2 | 110.46 | 0.15 | | | |
| 3 | 18.84 | 5.65 | 1.59447 | 68.0 | 0.0176 |
| 4 | −22.306 | 1.01 | 1.57392 | 52.7 | −0.0003 |
| 5 | 14.274 | 2.40 | | | |
| 6 | ∞ | 6.09 | | | |
| 7 | −12.236 | 1.01 | 1.57046 | 42.5 | −0.0014 |
| 8 | 39.496 | 5.00 | 1.60520 | 65.1 | 0.0061 |
| 9 | −18.927 | 0.33 | | | |
| 10 | −547.1 | 3.50 | 1.70557 | 41.0 | 0.0018 |
| 11 | −21.842 | 3.93 | | | |
| 12 | −18.975 | 2.40 | 1.61669 | 44.0 | −0.0115 |
| 13 | −44.946 | | | | |
| $\phi$T | | 0.0176 | (3) | | 0.07 |
| $\phi$2 | | 0.0552 | (4) | | −0.36 |
| $\phi$5 | | 0.0458 | (5) | | −0.028 |
| $\phi$7 | | −0.0181 | (6) | | 3rd, 7th |
| $\phi$3 | | −0.0666 | (7) | | 15.3 |

TABLE 4

| Surface | R | D | $N_e$ | $v_e$ | $\delta\theta$ |
|---|---|---|---|---|---|
| 1 | 45.022 | 3.60 | 1.58565 | 46.1 | −0.0002 |
| 2 | 154.24 | 0.80 | | | |
| 3 | 24.628 | 5.71 | 1.57098 | 70.9 | 0.0233 |
| 4 | −20.444 | 1.20 | 1.54344 | 46.9 | −0.0005 |
| 5 | 21.37 | 4.20 | | | |
| 6 | ∞ | 4.00 | | | |
| 7 | −11.657 | 1.20 | 1.51976 | 52.2 | −0.0007 |
| 8 | 25.806 | 5.71 | 1.57098 | 70.9 | 0.0233 |
| 9 | −17.632 | 0.25 | | | |
| 10 | −1336.600 | 4.00 | 1.64268 | 44.6 | −0.0010 |
| 11 | −22.954 | 6.00 | | | |
| 12 | −17.738 | 1.50 | 1.57829 | 41.2 | 0.0019 |
| 13 | −39.938 | | | | |
| φT | 0.0177 | (3) | | 0.13 | |
| φ2 | 0.0488 | (4) | | 0.37 | |
| φ5 | 0.0519 | (5) | | −0.013 | |
| φ7 | −0.0177 | | | | |
| φ3 | −0.0525 | | | | |

TABLE 5

| Surface | R | D | $N_e$ | $v_e$ | $\delta\theta$ |
|---|---|---|---|---|---|
| 1 | 40.27 | 2.80 | 1.58547 | 59.1 | −0.0021 |
| 2 | 179 | 2.50 | | | |
| 3 | 21.552 | 5.61 | 1.57098 | 70.3 | 0.0233 |
| 4 | −21.329 | 1.00 | 1.54982 | 53.3 | −0.0024 |
| 5 | 16.807 | 2.40 | | | |
| 6 | ∞ | 5.88 | 1.61669 | 44.0 | −0.0115 |
| 7 | −11.242 | 1.00 | | | |
| 8 | 49.997 | 5.41 | 1.57098 | 70.9 | 0.0233 |
| 9 | −15.96 | 0.85 | | | |
| 10 | 170.64 | 3.85 | 1.67340 | 47.0 | −0.0028 |
| 11 | −22.669 | 6.85 | | | |
| 12 | −20.144 | 1.25 | 1.54344 | 46.9 | −0.0005 |
| 13 | −57.741 | | | | |
| φT | 0.0175 | (3) | | 0.13 | |
| φ2 | 0.0507 | (4) | | −0.41 | |
| φ5 | 0.0458 | (5) | | −0.025 | |
| φ7 | −0.0174 | (6) | | 4th | |
| φ3 | −0.0590 | (7) | | 17.0 | |

What is claimed is:

1. A color image readout lens comprising, successively from an object side, a first lens group comprising a lens having a positive refracting power with a convex surface directed onto the object side, a second lens group, comprising a biconvex lens and a biconcave lens cemented thereto, with a convex surface directed onto the object side, a third lens group comprising a biconcave lens and a biconvex lens cemented thereto, having a negative refracting power as a whole with a convex surface directed onto an image side, a fourth lens group comprising a positive lens with a convex surface directed onto the image side, and a fifth lens group comprising a negative meniscus lens with a stronger concave surface directed onto the object side;

said color image readout lens further satisfying the following conditional expressions (1) to (3):

$$61.5 < v_2, \ 0.006 < \delta\theta_2 \quad (1)$$

$$61.5 < v_5, \ 0.006 < \delta\theta_5 \quad (2)$$

$$0.06 < (\phi_2/\phi_T)\cdot\delta\theta_2 + (\phi_5/\phi_T)\cdot\delta\theta_5 < 0.14 \quad (3)$$

where $\phi_T$ is the refracting power of the whole system; $\phi_i$, $v_i$, and $\delta\theta_i$ are the refracting power, dispersion, and anomalous dispersion with respect to g-d line of the i-th lens from the object side, respectively; $d_j$ is the j-th surface space from the object side; and $\delta\theta$ is the anomalous dispersion defined by the deviation $\delta\theta_{g,d}$ of partial dispersion ratio $\theta_{g,d}$ with respect to g-d line from a reference line; $\phi_T$, $\phi_i$, and $v_i$ being obtained at e-line.

2. A color image readout lens according to claim 1, further satisfying the following conditional expressions (4) and (5):

$$-0.65 < \phi_7 \cdot d_{6,11} < -0.30 \quad (4)$$

$$-0.030 < \phi_3/d_5 < -0.005 \quad (5)$$

where $d_{6,11}$ is the distance between the 6th and 11th surfaces from the object side.

3. A color image readout lens according to claim 1, wherein at least one of the lenses having a negative refracting power comprising the second, third, and fifth lens groups satisfies the following conditional expression (6):

$$39 < v_k < 57, \ \delta\theta_k < -0.005 \quad (6)$$

where $v_k$ and $\delta\theta_k$ are the dispersion and anomalous dispersion with respect to g-d line of the k-th lens from the object side.

4. A color image readout lens according to claim 2, wherein at least one of the lenses having a negative refracting power comprising the second, third and fifth lens groups satisfies the following conditional expression (6):

$$39 < v_k < 57, \ \delta\theta_k < -0.005 \quad (6)$$

where $v_k$ and $\delta\theta_k$ are the dispersion and anomalous dispersion with respect to g-d line of the k-th lens from the object side.

5. A color image readout lens according to claim 1, wherein the cemented lens in said second lens group satisfies the following conditional expression (7):

$$15 < v_2 - v_3 < 21 \quad (7)$$

where $v_2$ is the dispersion of the biconvex lens thereof, and $v_3$ is the dispersion of the biconcave lens thereof.

6. A color image readout lens according to claim 2, wherein the cemented lens in said second lens group satisfies the following conditional expression (7):

$$15 < v_2 - v_3 < 21 \quad (7)$$

where $v_2$ is the dispersion of the biconvex lens thereof, and $v_3$ is the dispersion of the biconcave lens thereof.

7. A color image readout lens according to claim 1, wherein said first lens group comprises a biconvex lens.

8. A color image readout lens according to claim 2, wherein said first lens group comprises a biconvex lens.

9. A color image readout lens according to claim 1, wherein said fourth lens group comprises a positive meniscus lens.

10. A color image readout lens according to claim 2, wherein said fourth lens group comprises a positive meniscus lens.

* * * * *